(12) United States Patent
Evans et al.

(10) Patent No.: US 7,895,275 B1
(45) Date of Patent: Feb. 22, 2011

(54) SYSTEM AND METHOD PROVIDING QUALITY BASED PEER REVIEW AND DISTRIBUTION OF DIGITAL CONTENT

(75) Inventors: Gregory Morgan Evans, Raleigh, NC (US); Thomas A. Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1150 days.

(21) Appl. No.: 11/536,153

(22) Filed: Sep. 28, 2006

(51) Int. Cl.
*G06F 13/00* (2006.01)
(52) U.S. Cl. .................................. 709/206
(58) Field of Classification Search .............. 709/206
See application file for complete search history.

(56) References Cited

U.S. PATENT DOCUMENTS

| | | |
|---|---|---|
| 5,633,678 A | 5/1997 | Parulski et al. |
| 5,758,257 A | 5/1998 | Herz et al. |
| 5,768,640 A | 6/1998 | Takahashi et al. |
| 5,790,935 A | 8/1998 | Payton |
| 6,247,009 B1 | 6/2001 | Shiiyama et al. |
| 6,304,729 B2 | 10/2001 | Honda et al. |
| 6,438,579 B1 | 8/2002 | Hosken |
| 6,507,371 B1 | 1/2003 | Hashimoto et al. |
| 6,629,104 B1 | 9/2003 | Parulski et al. |
| 6,657,661 B1 | 12/2003 | Cazier |
| 6,774,926 B1 | 8/2004 | Ellis et al. |
| 6,914,625 B1 | 7/2005 | Anderson et al. |
| 6,914,626 B2 | 7/2005 | Squibbs |
| 6,943,825 B2 | 9/2005 | Silvester |
| 6,987,985 B2 | 1/2006 | Purkayastha et al. |
| 7,016,668 B2 | 3/2006 | Vaidyanathan et al. |
| 7,079,176 B1 | 7/2006 | Freeman et al. |
| 7,106,360 B1 | 9/2006 | Frederick |

(Continued)

FOREIGN PATENT DOCUMENTS

GB 2306869 A 5/1997

(Continued)

OTHER PUBLICATIONS

E. Setton et al., "Cross-Layer Design of Ad Hoc Networks for Real-Time Video Streaming," IEEE Wireless Communications, vol. 12, issue 4, pp. 99-102, Aug. 2005.

(Continued)

*Primary Examiner*—Robert B Harrell
(74) *Attorney, Agent, or Firm*—Withrow & Terranova, PLLC

(57) ABSTRACT

A digital content review and distribution system and method are provided. In general, a number of authors of digital content register with a content review and distribution agent, which may be hosted by a central server. The authors agree to review digital content submitted by other authors in exchange for review and distribution of their own content. In operation, an author submits metadata associated with digital content to be reviewed and optionally the digital content to the content review and distribution agent. In response to the submission, the content review and distribution agent effects a review of the digital content by one or more groups of reviewers, where the groups of reviewers are selected from the other authors registered with the content review and distribution agent based on the metadata for the digital content and reviewer credentials of the other authors.

30 Claims, 10 Drawing Sheets

U.S. PATENT DOCUMENTS

| | | |
|---|---|---|
| 7,149,549 B1 | 12/2006 | Ortiz et al. |
| 7,219,301 B2 * | 5/2007 | Barrie et al. ................ 715/751 |
| 2002/0010759 A1 | 1/2002 | Hitson et al. |
| 2002/0045987 A1 | 4/2002 | Ohata et al. |
| 2002/0054578 A1 | 5/2002 | Zhang et al. |
| 2002/0061029 A1 | 5/2002 | Dillon |
| 2002/0071677 A1 | 6/2002 | Sumanaweera |
| 2002/0104099 A1 | 8/2002 | Novak |
| 2002/0129367 A1 | 9/2002 | Devara |
| 2002/0144267 A1 | 10/2002 | Gutta et al. |
| 2002/0156842 A1 | 10/2002 | Signes et al. |
| 2002/0191087 A1 | 12/2002 | Hashimoto et al. |
| 2003/0037333 A1 | 2/2003 | Ghashghai et al. |
| 2003/0050055 A1 | 3/2003 | Ting et al. |
| 2003/0081580 A1 | 5/2003 | Vaidyanathan et al. |
| 2003/0156208 A1 | 8/2003 | Obradovich |
| 2003/0161268 A1 | 8/2003 | Larsson et al. |
| 2004/0021780 A1 | 2/2004 | Kogan |
| 2004/0030798 A1 | 2/2004 | Andersson et al. |
| 2004/0032495 A1 | 2/2004 | Ortiz |
| 2004/0042421 A1 | 3/2004 | Mahany |
| 2004/0049787 A1 | 3/2004 | Maissel et al. |
| 2004/0117824 A1 | 6/2004 | Karaoguz et al. |
| 2004/0174434 A1 | 9/2004 | Walker et al. |
| 2004/0174443 A1 | 9/2004 | Simske |
| 2004/0248615 A1 | 12/2004 | Purkayastha et al. |
| 2004/0264372 A1 | 12/2004 | Huang |
| 2005/0008017 A1 | 1/2005 | Datta et al. |
| 2005/0034001 A1 | 2/2005 | Pontarelli |
| 2005/0091232 A1 | 4/2005 | Eschbach et al. |
| 2005/0108769 A1 | 5/2005 | Arnold et al. |
| 2005/0120127 A1 | 6/2005 | Bradley et al. |
| 2005/0183120 A1 | 8/2005 | Jain et al. |
| 2005/0192987 A1 | 9/2005 | Marsh |
| 2005/0193421 A1 | 9/2005 | Cragun |
| 2005/0198068 A1 | 9/2005 | Mukherjee et al. |
| 2005/0216942 A1 | 9/2005 | Barton |
| 2005/0239497 A1 | 10/2005 | Bahl et al. |
| 2005/0278379 A1 | 12/2005 | Nakazawa |
| 2005/0286438 A1 | 12/2005 | Rajkotia |
| 2006/0015193 A1 | 1/2006 | Kato |
| 2006/0048185 A1 | 3/2006 | Alterman |
| 2006/0048186 A1 | 3/2006 | Alterman |
| 2006/0053452 A1 | 3/2006 | Lee et al. |
| 2006/0056349 A1 | 3/2006 | Nakatugawa et al. |
| 2006/0080707 A1 | 4/2006 | Laksono |
| 2006/0085830 A1 | 4/2006 | Bruck et al. |
| 2006/0195325 A1 | 8/2006 | Tateson et al. |
| 2006/0221190 A1 | 10/2006 | Limberis et al. |
| 2006/0271691 A1 | 11/2006 | Jacobs et al. |
| 2006/0271960 A1 | 11/2006 | Jacoby et al. |
| 2006/0271997 A1 | 11/2006 | Jacoby et al. |
| 2007/0064121 A1 | 3/2007 | Issa et al. |
| 2007/0078833 A1 | 4/2007 | Chea et al. |
| 2007/0101368 A1 | 5/2007 | Jacoby et al. |
| 2007/0143778 A1 | 6/2007 | Covell et al. |
| 2007/0169165 A1 | 7/2007 | Crull et al. |

FOREIGN PATENT DOCUMENTS

| | | |
|---|---|---|
| WO | WO 00/40021 A1 | 7/2000 |

OTHER PUBLICATIONS

PC Connection, http://www.pcconnection.com/ProductDetail?sku=5373172&SourceID=k40132, 2006.

Vijay T. Raisinghani et al., "ECLAIR: An Efficient Cross Layer Architecture for Wireless Protocol Stacks," 5th World Wireless Congress, San Francisco, CA, May 25-28, 2004.

Vineet Srivastava et al., "Cross-Layer Design: A Survey and the Road Ahead," IEEE Communications Magazine, pp. 112-119, Dec. 2005.

Limberis et al., "Notification system for capturing new or unknown metadata for Personal Image/Video Meta Data Capture system and Alerts," (U.S. Provisional Application), Apr. 1, 2005, U.S. Appl. No. 60/670,969, pp. 1-7.

* cited by examiner

SYSTEM AND METHOD PROVIDING QUALITY BASED PEER REVIEW AND DISTRIBUTION OF DIGITAL CONTENT

FIELD OF THE INVENTION

The present invention relates to peer review and distribution of digital content.

BACKGROUND OF THE INVENTION

Today, most content sharing systems use author content tagging, end-user review, or dedicated reviewers or editors to rank or assign a quality level to shared content. As a result, especially where authors and end-users perform the review, shared content is seldomly reviewed by qualified persons. Further, systems using dedicated reviewers or editors require a significant amount of overhead for the review process. As such, there is a need for a digital content review system that provides review of digital content by qualified persons while reducing or eliminating the overhead associated with dedicated reviewers.

SUMMARY OF THE INVENTION

The present invention provides a digital content review and distribution system. In general, a number of authors of digital content register with a content review and distribution agent, which may be hosted by a central server. The authors agree to review digital content submitted by other authors in exchange for review and distribution of their own content. In operation, an author submits metadata associated with digital content to be reviewed and optionally the digital content to the content review and distribution agent. The metadata may include a target quality level for the digital content, information describing the digital content, or both the target quality level for the digital content and information describing the digital content. In response to the submission, the content review and distribution agent effects a review of the digital content by one or more groups of reviewers, where the groups of reviewers are selected from the other authors registered with the content review and distribution agent based on the metadata for the digital content and reviewer credentials of the other authors.

In one embodiment, the review process is an iterative process based on quality level. First, the content review and distribution agent selects a group of reviewers for a first quality level, where the first quality level is less than the target quality and may be, for example, a minimum quality level. Once the content is reviewed, the content review and distribution agent determines whether to continue the review to the next quality level. The content review and distribution agent may automatically determine whether to proceed to the next quality level based on the feedback from the reviewers. If the content meets the requirements of the first quality level, then the review proceeds to the next quality level. The process continues until the digital content is reviewed to the target quality level or fails to satisfy the requirements for a quality level. Alternatively, in order to determine whether to continue to the next quality level, the content distribution agent may provide the feedback to the author, where the author decides whether to submit the content for review at the next quality level based on the feedback. The process continues until the digital content is reviewed to the target quality level or the author chooses to discontinue the review process based on the feedback. Once the review process is complete, the author may choose to distribute the content via one or more commercial or peer-to-peer distribution entities.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
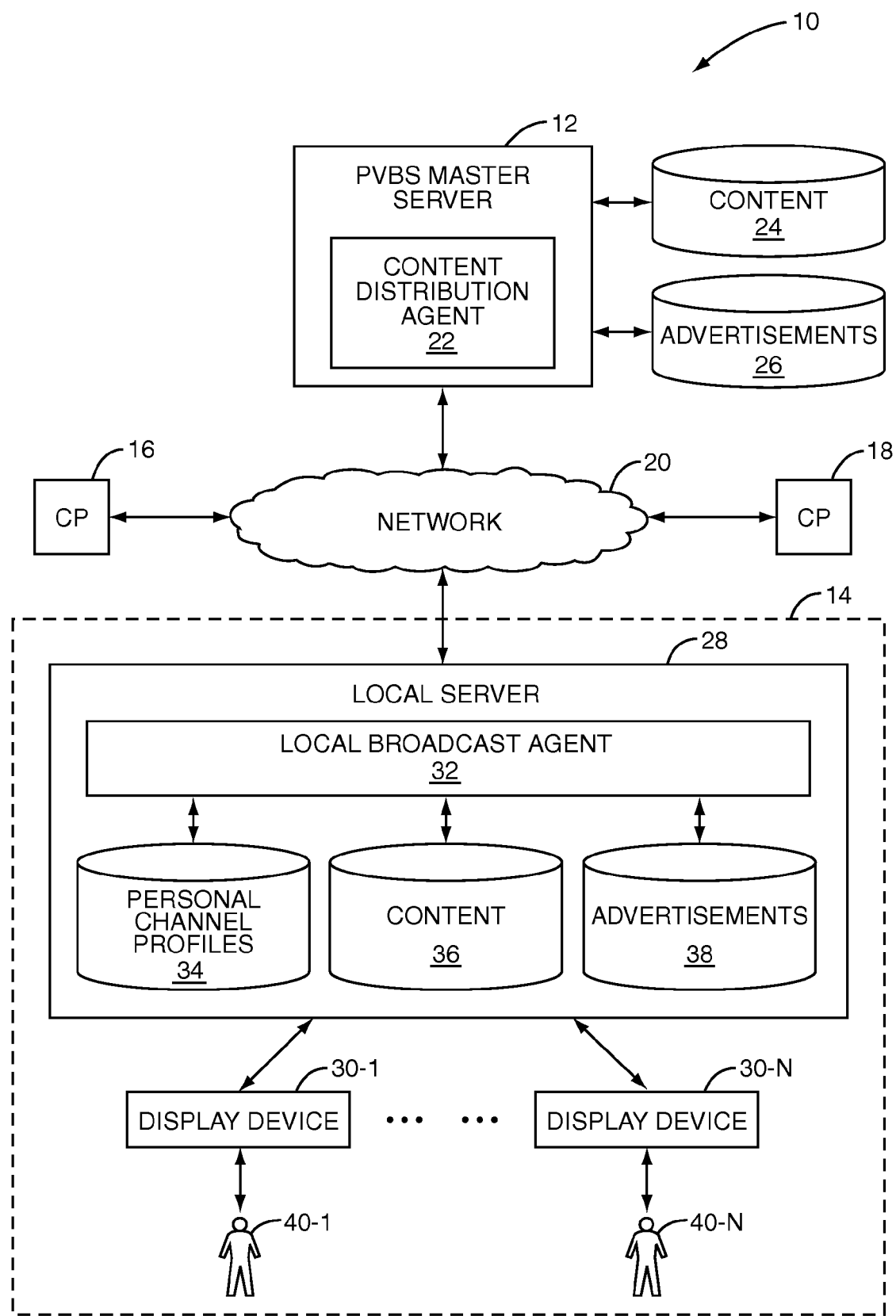
FIG. 1 illustrates a Personal Video Broadcast System (PVBS) according to one embodiment of the present invention.

FIG. 1 illustrates a Personal Video Broadcast System (PVBS) 10 according to one embodiment of the present invention. Note that while the discussion herein focuses on video content, the personal broadcast channels are not limited thereto. In general, the PVBS 10 includes a Personal Video Broadcast System (PVBS) master server 12 and a number of consumer premises (CPs) 14-18 communicatively coupled by a network 20. Preferably, the network 20 is a Wide Area Network (WAN). However, the present invention is not limited thereto. As an example, the network 20 may be a distributed public access network such as the Internet. In addition, the customer premises 14-18 preferably have high speed connections to the network 20 such as, for example, Fiber-To-The-Home (FTTH) connections to the network 20 via one or more FTTH distribution networks.

The PVBS master server 12 includes a content distribution agent 22, which may be implemented in software, hardware, or a combination of software and hardware. The PVBS master server 12 may also maintain or be associated with a content database 24 and an advertisements database 26. The content database 24 may include commercial video content such as movies and television programs provided by commercial television content providers. In addition or alternatively, the content database 24 may include content authored and distributed by peer users. An exemplary system for providing content authored and distributed by peer users is discussed below with respect to FIGS. 8-12. The advertisements database 26 operates to store advertisements and optionally distribution criteria or distribution lists for the advertisements. As discussed below, the content distribution agent 22 operates to distribute video content and optionally advertisements from the databases 24 and 26 to the CPs 14-18.

It should be noted that while the content distribution agent 22 is illustrated as being hosted by the PVBS master server 12, the present invention is not limited thereto. For example, both the content distribution agent 22 and the content corresponding to the content database 24 may be hosted by one or more peers in a peer-to-peer (P2P) network. Thus, the content distribution agent 22 may operate to effect distribution of content from peers in the P2P network to the CPs 14-18 in a manner similar to that described below for the PVBS master server 12.

The CP 14 includes a local server 28 communicatively coupled to a number of display devices 30-1 through 30-N. Note that the following discussion is equally applicable to the other CPs 16 and 18. The local server 28 may also be referred to herein as an in-home server. The local server 28 includes a local broadcast agent 32, a personal channel profiles database 34, a content database 36, and an advertisements database 38. The local broadcast agent 32 may be implemented in software, hardware, or a combination of software and hardware. The personal channel profiles database 34, the content database 36, and the advertisements database 38 may be implemented in one or more digital storage devices such as one or more hard disk drives, one or more optical storage devices, memory, or the like. Further, the content database 36, for example, may be distributed among multiple devices within the CP 14.

The personal channel profiles database 34 operates to store a channel profile for each of a number of personal broadcast channels defined by users 40-1 through 40-N. Each of the channel profiles includes information identifying types of content to be broadcast on the associated personal broadcast channel and a format for the personal broadcast channel. Note that unlike Video-on-Demand (VoD) systems, the personal broadcast channels define types of content to be broadcast rather than selecting a particular video for viewing on demand. The types of content to be broadcast via the personal broadcast channel may be defined using various metadata. The metadata may include, for example, media type such as movie or television program; genre such as sports, news, history, drama, comedy, mystery, action, or science fiction; time period such as 1950s, 1960s, 1970s, 1980s, 1990s, or 2000s; television program series title such as Star Trek, Seinfeld, or Survivor; actors or actresses in the movie or television program; director of the movie or television program; or the like or any combination thereof. The exemplary metadata mentioned above for defining types of content is not intended to limit the scope of the present invention. Other types of metadata for defining types of content will be apparent to one of ordinary skill in the art upon reading this specification.

In addition, each of the channel profiles may include information identifying a desired format for the associated personal broadcast channel. The format may define a time at which the personal broadcast channel is to be active. For example, the format may be 24 hours a day, 7 days a week; from the hours of 5 p.m. to 9 p.m. on Monday through Friday; or the like. Still further, the format may be defined such that different types of content are broadcast at different times of the day. For example, the format may be defined such that educational content for children is broadcast from 8 a.m. until noon, television programs from the comedy genre are broadcast from noon until 5 p.m., news content is broadcast from 5 p.m. until 6 p.m., and episodes of Star Trek are broadcast from 6 p.m. until 10 p.m. The exemplary formats given above are not intended to limit the scope of the present invention.

The content database 36 operates to store content for the personal broadcast channels distributed to the local server 28 from the content distribution agent 22 of the PVBS master server 12. Likewise, the advertisements database 38 operates to store advertisements for the personal broadcast channels distributed to the local server 28 from the content distribution agent 22 of the PVBS master server 12.

Each of the display devices 30-1 through 30-N may be a television, a set-top box, a set-top box with digital video recorder functionality, a personal computer, a portable device such as a Personal Digital Assistant (PDA) or mobile telephone, or the like enabling users 40-1 through 40-N to view the personal broadcast channels provided by the local broadcast agent 32.

Figure 2:
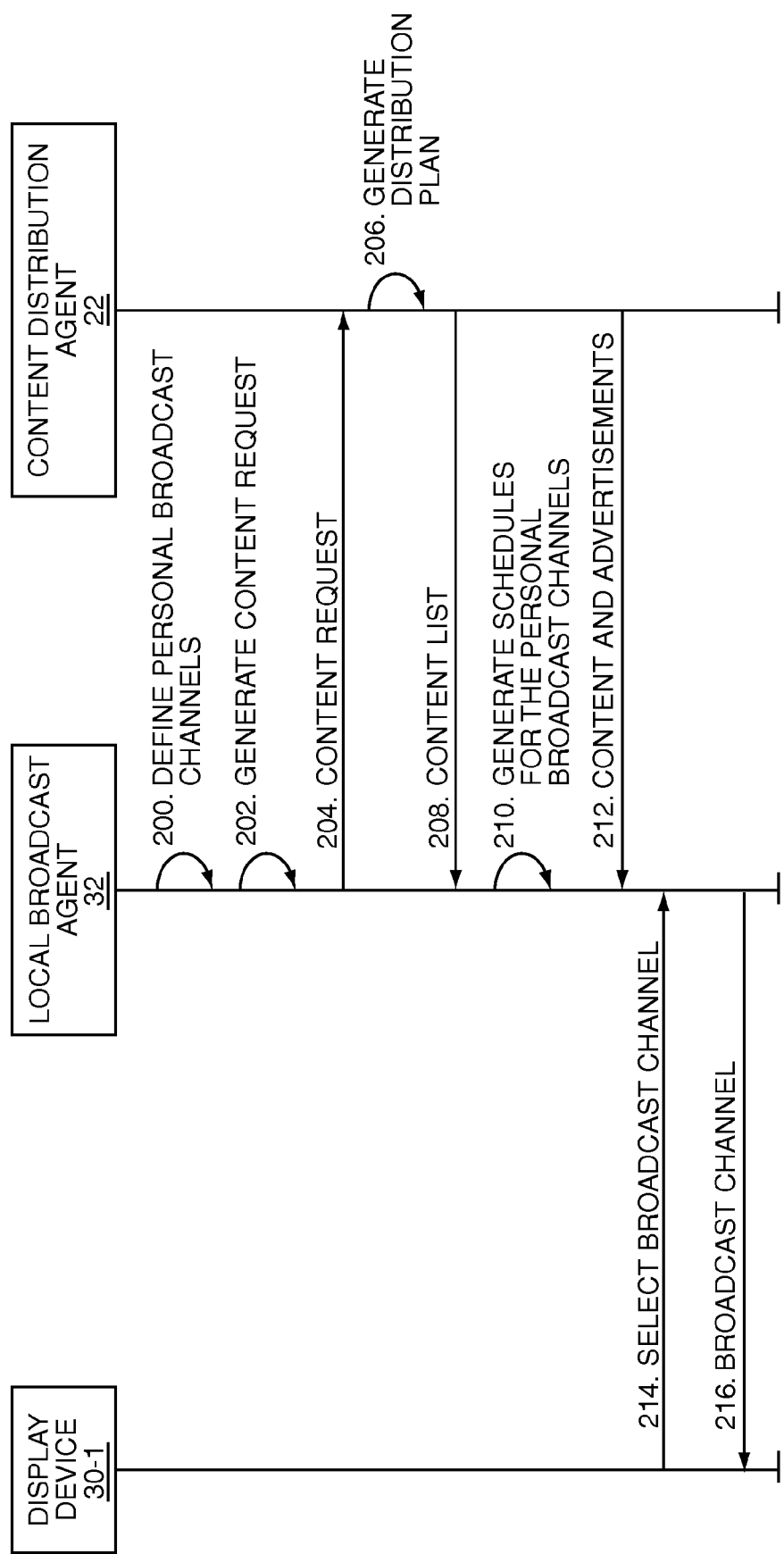
FIG. 2 illustrates the operation of the PVBS according to one embodiment of the present invention.

FIG. 2 illustrates the operation of the PVBS 10 of FIG. 1 according to one embodiment of the present invention. In general, the users 40-1 through 40-N interact with the local broadcast agent 32 via the display devices 30-1 through 30-N to define one or more personal broadcast channels (step 200). For each personal broadcast channel, a personal channel profile is defined. Alternatively, the users 40-1 through 40-N may interact directly with the local server 28 to define the personal channel profiles for the personal broadcast channels. As discussed above, the personal channel profiles include information identifying types of content desired for the personal broadcast channels and optionally formats for the personal broadcast channels.

The local broadcast agent 32 then generates a request for content to be provided to the content distribution agent 22 (step 202). More specifically, the local broadcast agent 32 aggregates the personal channel profiles to identify the types of content desired for the associated personal broadcast channels and optionally the relative amounts of content desired for each of the types of content. For example, if there is a 24 hour personal broadcast channel for sports content and a 1 hour a day or a 1 hour segment of a broadcast channel for news, then the local broadcast agent 32 may determine that the personal broadcast channels desire a greater amount of sports content than news content. As such, the generated request may provide information indicating that more sports content is desired than news content. Note that the request generated by the local broadcast agent 32 is a request for types of content in general. The request preferably does not include information regarding the specific users 40-1 through 40-N. As such, privacy is maintained between the PVBS master server 12 and the users 40-1 through 40-N.

The local broadcast agent 32 then sends the request to the content distribution agent 22 at the PVBS master server 12 (step 204). In a similar fashion, the content distribution agent 22 may receive requests from the local broadcast agents of the other CPs 16 and 18 in the PVBS 10. The content distribution agent 22 then generates a distribution plan for distributing content to the local broadcast agent 32 as well as the local broadcast agents of the other CPs 16 and 18 (step 206). The distribution plan may be generated, for example, daily or weekly. More specifically, the content distribution agent 22 identifies content from the content database 24 and optionally advertisements from the advertisements database 26 to distribute to the local broadcast agent 32 of the CP 14. Likewise, the content distribution agent 22 may identify content and advertisements for the other CPs 16 and 18. In order to efficiently distribute content to the CP 14 as well as to the other CPs 16 and 18, the content distribution agent 22 aggregates the request from the local broadcast agent 32 with requests from the local broadcast agents of the other CPs 16 and 18 and generates the distribution plan such that content and optionally advertisements are multicast to the CPs 14-18. For example, if a particular video is to be distributed to the CPs 14 and 16, the content distribution agent 22 may generate the distribution plan such that the video is multicast to the local broadcast agents of the CPs 14 and 16, thereby providing the video to both of the CPs 14 and 16 using a single transfer of the video.

From this point on, the local broadcast agent 32 generally operates to generate the personal broadcast channels based on content and optionally advertisements received from the content distribution agent 22 in response to the request and broadcast the personal broadcast channels to one or more of the display devices 30-1 through 30-N.

In this embodiment, content distribution agent 22 provides a content list to the local broadcast agent 32 identifying content and optionally advertisements that are to be distributed to the local broadcast agent 32 (step 208). Note that the content list may be redistributed or updated periodically such as daily or weekly in light of changes in content availability. For each video, or more generally digital asset, to be distributed to the local broadcast agent 32, the content list may include a title; estimated time at which the video will be distributed; a brief description of the video content; a length of the video content; information identifying a quality of the video; Digital Rights Management (DRM) rights such as one time play, multiple plays, and/or whether rewind and pausing are allowed; and advertisement insertion information such as types of advertisements that may be inserted into the video content, a total advertisement time required for the video content, and an overall video value to advertisement value. The overall video value to advertisement value provides an indication as to the relative value of commercials in the content. In a similar fashion, the content list may include information regarding advertisements to be distributed to the local broadcast agent 32 such as the advertisement type, run time, and the desired program to advertisement value.

Based on the content list and the personal channel profiles, the local broadcast agent 32 generates schedules for the personal broadcast channels (step 210). More specifically, based on the personal channel profiles, the local broadcast agent 32 analyzes the information provided in the content list to associate each video identified by the content list to one or more of the personal broadcast channels. Then, for each personal broadcast channel, a schedule is generated that provides the broadcast time and sequence of broadcast for the videos associated with the personal broadcast channel.

In addition, the local broadcast agent 32 may insert advertisement slots into the schedules for the personal broadcast channels. As stated above, the content list may include advertisement information identifying the types of advertisements to be inserted into each video, the total advertisement time for each video, and the overall program value to advertisement value for each video. In addition, the content list may include information regarding advertisements that are to be delivered to the local broadcast agent 32. Based on this information, the local broadcast agent 32 may insert advertisement slots into the schedules for the personal broadcast channels. The advertisement slots may be inserted during videos in the schedule and/or between successive videos in the schedule. In addition, advertisements may be placed in an Electronic Program Guide (EPG) or the like used to access the personal broadcast channels.

When selecting advertisements to be inserted into the schedules, the local broadcast agent 32 may consider the viewing habits of the user 40-1. For example, the local broadcast agent 32 may identify a prime viewing time for the user 40-1 based on the viewing habits of the user 40-1. As such, the content scheduled for this prime viewing time may be given a higher program to advertisement value. As such, advertisements that are desired to be inserted during content having high program to advertisement value may be inserted during the prime viewing time for the user 40-1.

Alternatively, rather than the local broadcast agent 32 inserting advertisement slots in the schedules, the content provided by the content distribution agent 22 may already include advertisements or advertisement slots.

Thereafter, the content and optionally advertisements for the personal broadcast channels are distributed to the local broadcast agent 32 according to the distribution plan of the content distribution agent 22 (step 212). In one embodiment, the content distribution agent 22 pushes the content and advertisements to the local broadcast agent 32 as well as the local broadcast agents of the CPs 16 and 18 using a multicasting scheme. More specifically, the distribution plan may identify each of the CPs 14-18 that are to receive a particular video. Thus, when the video is to be distributed, the content distribution agent 22 multicasts the video to the local broadcast agents of the CPs 14-18 that are to receive the video. In another embodiment, the content distribution agent 22 implements a hybrid push/pull scheme wherein the content distribution agent 22 multicasts content and advertisements to each of a number of the CPs 14-18, all of which may or may not desire the content and advertisements. As such, the local broadcast agents of the CPs 14-18 may obtain desired content and advertisements from the multicast and ignore content and advertisements that are not desired. The content and advertisements distributed to the local broadcast agent 32 are stored in the content database 36 and the advertisements database 38 of the local server 28.

Note that the content and advertisements may be assigned an aging out period by either the content distribution agent 22 or the local broadcast agent 32. The aging out period defines a period of time after which the associated content or advertisement is removed from storage at the local server 28. The user 40-1 may be given the ability to override the aging out period.

The distribution scheme described herein provides substantial benefits. For example, the content distribution agent 22 may provide content to the CPs 14-18 during off-peak hours, such as during the hours of 10 pm to 6 am, when the PVBS master server 12, the local server 28, and the network 20 are likely not to be experiencing heavy loads. Further, by pre-pushing the content to the local server 28 before broadcasting, quality of service issues associated with streaming content over the network 20 are avoided.

In this embodiment, at the request of the user 40-1, the display device 30-1 sends a selection message to the local broadcast agent 32 selecting a personal broadcast channel to view at the display device 30-1 (step 214). The local broadcast agent 32 then broadcasts the content and advertisements for the selected personal broadcast channel to the display device 30-1 according to the schedule generated for the selected personal broadcast channel, thereby providing the personal broadcast channel (step 216). The selected personal broadcast channel may be provided over an unused cable television channel or over a Local Area Network (LAN) connection. In an alternative embodiment, the personal broadcast channels may be continuously broadcast to the display devices 30-1 through 30-N over different channels where the display devices 30-1 through 30-N are tuned to the channel for the selected personal broadcast channel. It should be noted that not all content for the personal broadcast channel needs to be distributed to the local server 28 before broadcasting can begin. As long as content that is to be distributed at the current time is stored or at least partially stored at the local server 28, the broadcast can take place.

When providing personal broadcast channels to the display devices 30-1 through 30-N over a LAN connection or digital cable television channel, DRM restrictions may be used to control access to the personal broadcast channels. For example, DRM restrictions may be applied to a personal broadcast channel defined by the user 40-1 such that the personal broadcast channel is only accessible to the user 40-1 at the display device 30-1. The manner in which DRM restrictions may be applied to the personal broadcast channels will be apparent to one of ordinary skill in the art upon reading this disclosure.

While not illustrated, the local broadcast agent 32 may monitor the viewing habits of the user 40-1. Based on the viewing habits of the user 40-1, the local broadcasting agent 32 may adjust the amounts of the desired types of content requested from the content distribution agent 22. Alternatively, the local broadcasting agent 32 may provide information describing the viewing habits of the user 40-1 to the content distribution agent 22, where the content distribution agent 22 may consider the viewing habits of the user 40-1 when identifying content and the amounts of content to distribute to the local broadcast agent 32.

Figure 3:
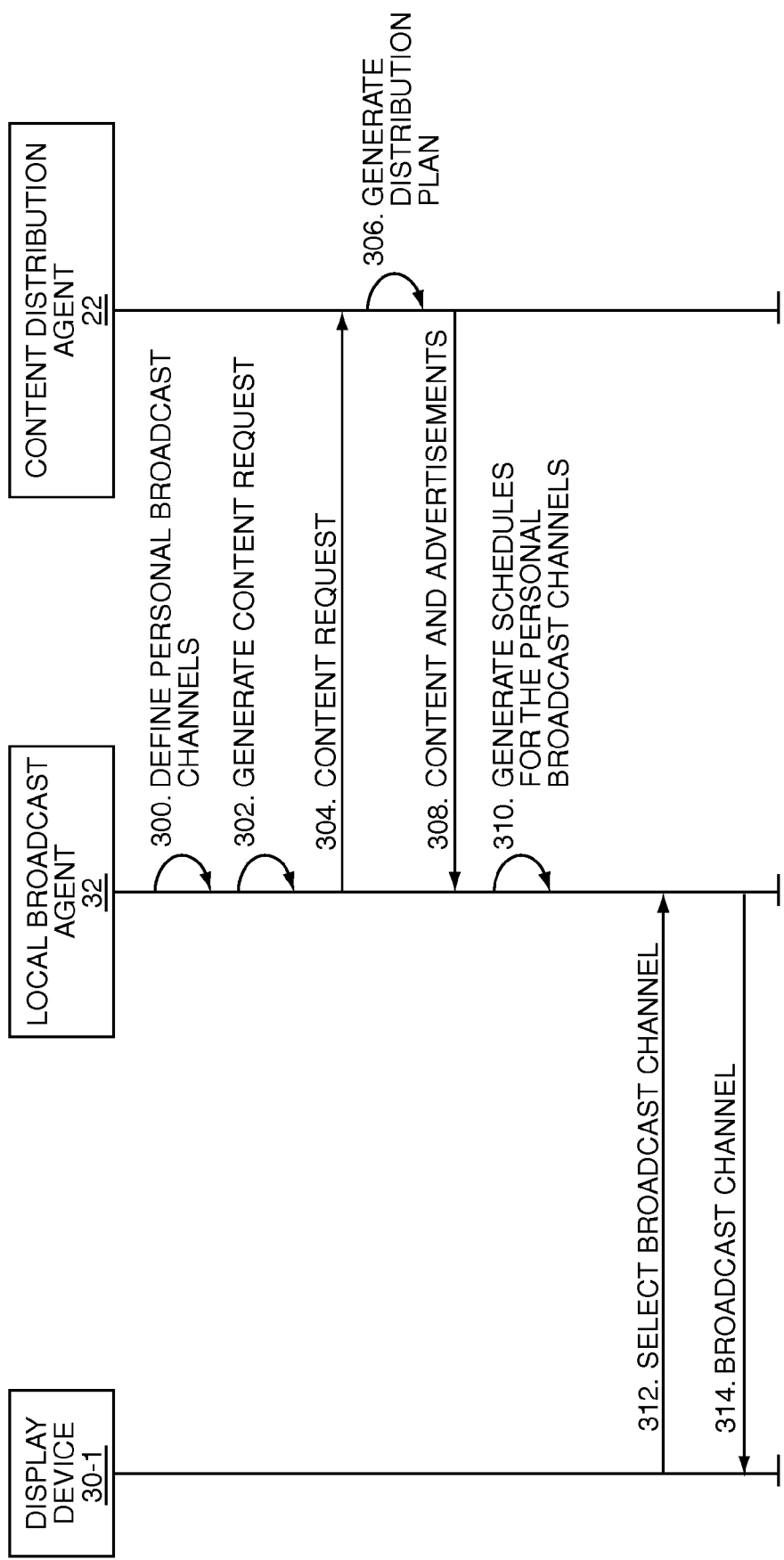
FIG. 3 illustrates the operation of the PVBS according to another embodiment of the present invention.

FIG. 3 illustrates the operation of the PVBS 10 of FIG. 1 according to a second embodiment of the present invention. In this embodiment, the content distribution agent 22 does not provide the content list to the local broadcast agent 32, and the local broadcast agent 32 generates the personal broadcast channels as content is delivered to the local server 28. More specifically, the users 40-1 through 40-N interact with the local broadcast agent 32 via the display devices 30-1 through 30-N to define one or more personal broadcast channels (step 300). For each personal broadcast channel, a personal channel profile is defined. Alternatively, the users 40-1 through 40-N may interact directly with the local server 28 to define the personal channel profiles for the personal broadcast channels. The local broadcast agent 32 then generates a request for content to be provided to the content distribution agent 22 (step 302).

The local broadcast agent 32 then sends the request to the content distribution agent 22 at the PVBS master server 12 (step 304). In a similar fashion, the content distribution agent 22 may receive requests from the local broadcast agents of the other CPs 16 and 18 in the PVBS 10. The content distribution agent 22 then generates a distribution plan for distributing content to the local broadcast agent 32 as well as the local broadcast agents of the other CPs 16 and 18 (step 306). The content distribution agent 22 then provides content and optionally advertisements to the local broadcast agent 32 according to the distribution plan (step 308).

As content and advertisements are delivered to the local broadcast agent 32 or at some point thereafter, the local broadcast agent 32 generates schedules for the personal broadcast channels based on the corresponding personal channel profiles (step 310). As discussed above, the schedules for the personal broadcast channels may be generated by analyzing the videos and optionally advertisements delivered to the local broadcast agent 32 or metadata associated therewith to associate each video and advertisement with one or more of the personal broadcast channels based on the personal channel profiles. The schedule for each of the personal video channels may then be generated to provide a broadcast sequence and broadcast times for the associated videos and advertisements.

In this embodiment, at the request of the user 40-1, the display device 30-1 sends a selection message selecting a personal broadcast channel to view at the display device 30-1 (step 312). The local broadcast agent 32 then broadcasts the videos and advertisements for the selected personal broadcast channel to the display device 30-1 according to the schedule generated for the selected personal broadcast channel, thereby providing the personal broadcast channel, as described above (step 314).

Figure 4:
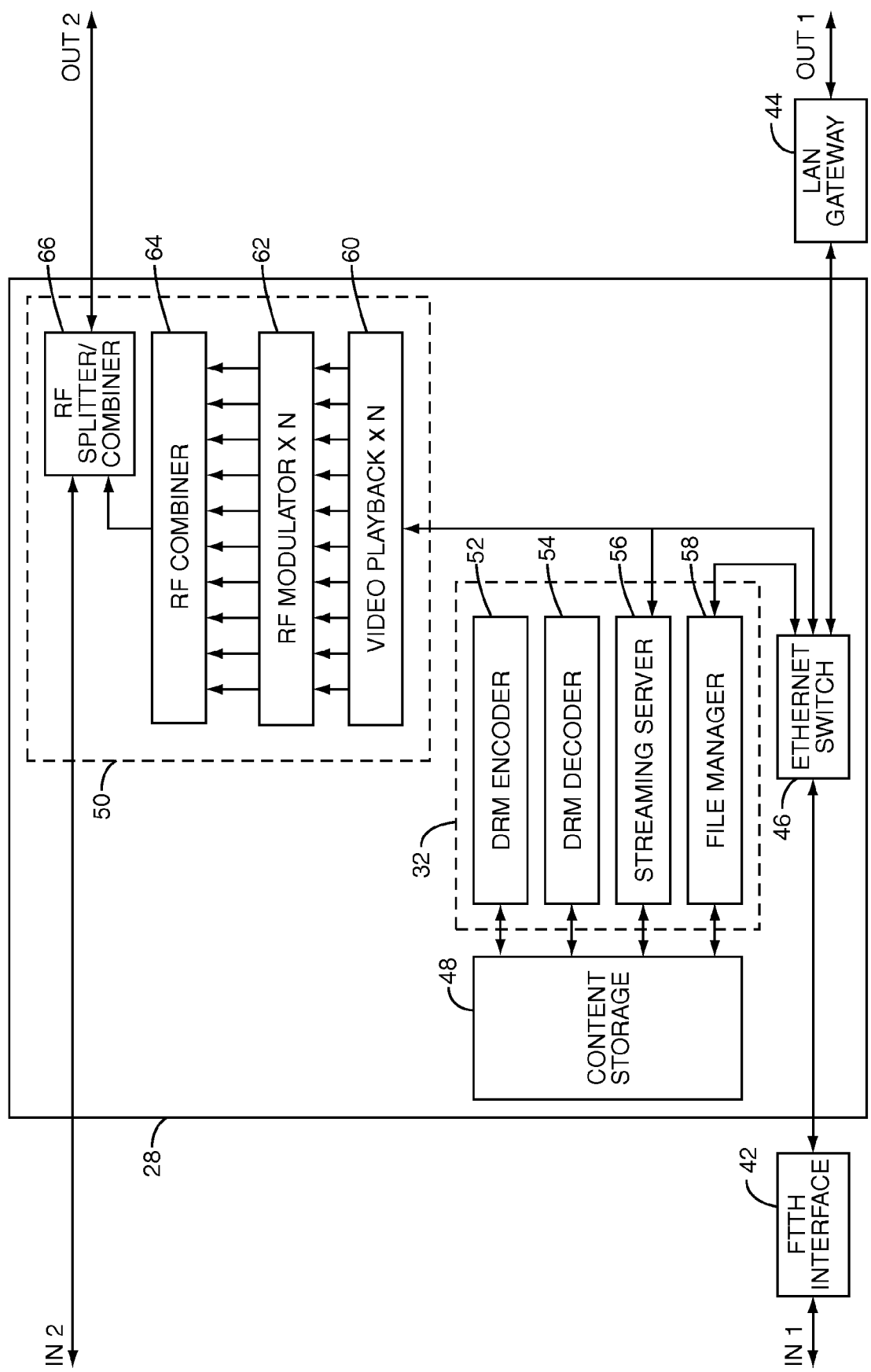
FIG. 4 is a block diagram of the local server of FIGS. 1-3 according to one embodiment of the present invention.

FIG. 4 is a block diagram of the local server 28 according to one embodiment of the present invention. In general, the local server 28 is communicatively coupled to the network 20 via a FTTH interface 42. Note that the FTTH interface 42 is exemplary. Other types of high speed interfaces may be used to connect the local server 28 to the network 20. The FTTH interface 42 provides a high speed connection to the network 20 for delivery of content and optionally advertisements for personal broadcast channels according to the present invention. The local server 28 may also be communicatively coupled to a Local Area Network (LAN) via a LAN gateway 44. This may be particularly beneficial where the display devices 30-1 through 30-N are personal computers or like device having a LAN interface rather than a traditional analog or digital cable television interface.

As illustrated, the local server 28 includes an Ethernet switch 46, the local broadcast agent 32, a content storage device 48, and a radio frequency (RF) output 50. The Ethernet switch 46 operates in one of three modes. In a first mode, the Ethernet switch 46 connects the FTTH interface 42 to the local broadcast agent 32 for communication between the local broadcast agent 32 and the content distribution agent 22 according to the present invention. In a second mode, the Ethernet switch 46 connects the FTTH interface 42 to the LAN gateway 44 for direct communication between LAN devices and the network 20. In a third mode, the Ethernet switch 46 connects the local broadcast agent 32 to the LAN gateway 44 for communication between the local broadcast agent 32 and ones of the display devices 30-1 through 30-N connected to the local server 28 via the LAN.

As illustrated in this embodiment, the local broadcast agent 32 includes a DRM encoder function 52, a DRM decoder function 54, a streaming server function 56, and a file manager function 58. The functions 52-58 may be implemented in software, hardware, or a combination thereof. The DRM encoder and decoder functions 52 and 54 may be used where content provided to the local broadcast agent 32 or the personal broadcast channels provided by the local broadcast agent 32 have or are to have DRM restrictions. The streaming server function 56 operates to stream or broadcast the personal broadcast channels to the display devices 30-1 through 30-N either over the LAN via the LAN gateway 44 or a traditional cable television connection via the RF output 50. The file manager function 58 operates to receive content and advertisements from the content distribution agent 22 via the FTTH interface 42 and store the content and advertisements in the content storage device 48. Due to the high speed connection provided by the FTTH interface 42, the file manager function 58 may buffer incoming files using high speed memory and transfer the buffered files to the content storage device 48. Note that the content storage device 48 may include one or more storage units such as one or more hard disk drives. As such, in order to efficiently transfer the buffered file to storage, the file manager function 58 may simultaneously transfer segments of the buffered file to different storage units and thereafter manage the segments of the file as a single file.

The RF output 50 enables the local broadcast agent 32 to broadcast the personal broadcast channels to the display devices 30-1 through 30-N using a traditional cable television connection. More specifically, each user 40-1 through 40-N, or alternatively each display device 30-1 through 30-N, may be assigned an unused cable television channel. As such, the streaming server function 56 may provide a different personal broadcast channel for each of the users 40-1 through 40-N, where the personal broadcast channels are combined into a single data stream. A video playback function 60 of the RF output 50 processes the output of the streaming server function 56 to provide a separate analog output for each of the personal broadcast channels. An RF modulator function 62 operates to upconvert the analog outputs to desired RF frequencies, which preferably correspond to unused cable television channels. An RF combiner function 64 then combines the upconverted analog outputs into a combined RF signal. An RF splitter/combiner function 66 then combines the combined RF signal with an input signal from an associated land-based or satellite-based television service provider. The display devices 30-1 through 30-N may then tune to channels corresponding to the personal broadcast channels in order to view the personal broadcast channels.

Figure 5:
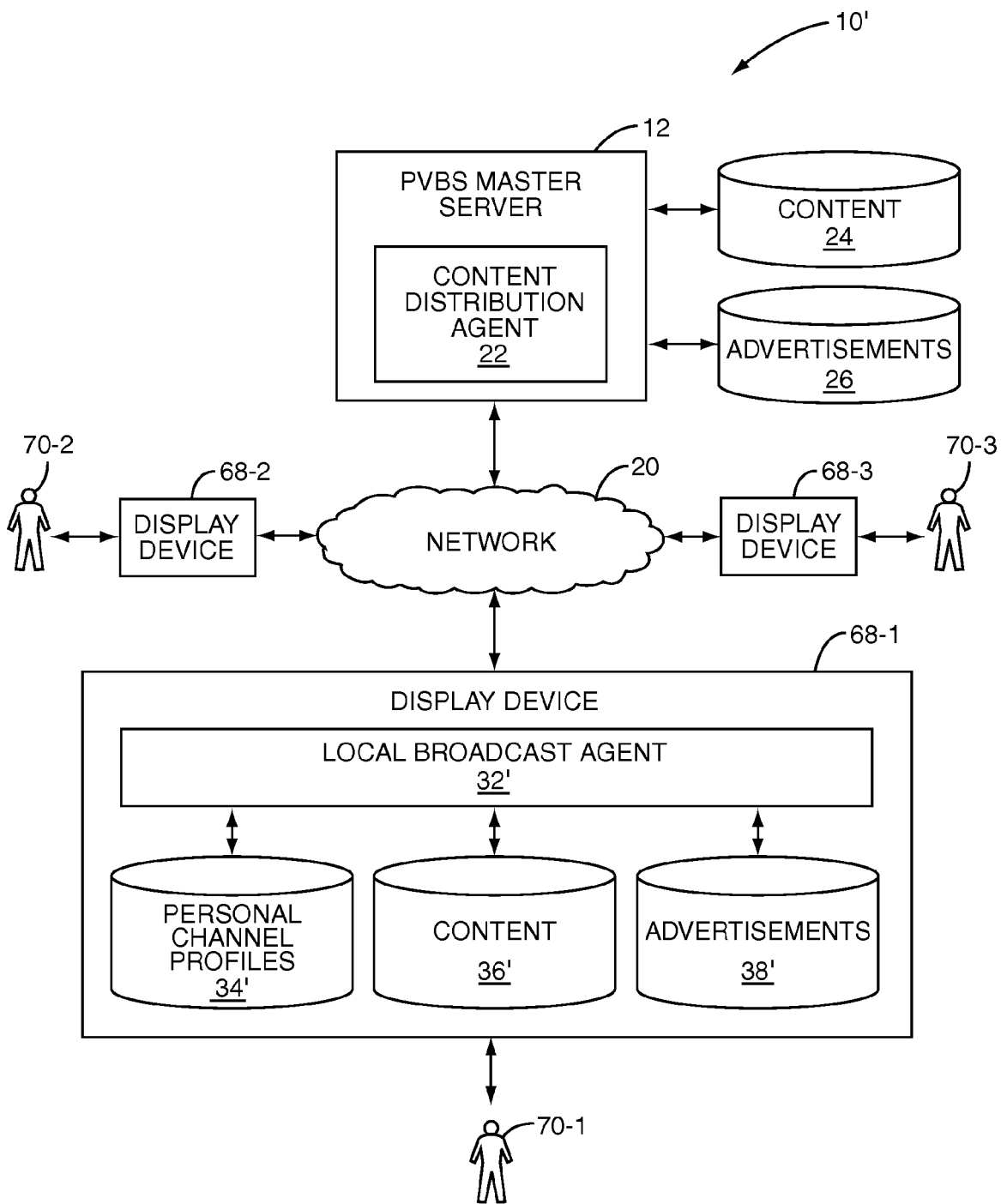
FIG. 5 illustrates the PVBS according to another embodiment of the present invention.

FIG. 5 illustrates a PVBS 10' according to another embodiment of the present invention. This embodiment is substantially the same as that described above. However, in this embodiment, local broadcast agents are implemented on each of a number of display devices 68-1 through 68-3 rather than on a local or in-home server. Note that while the embodiments of FIGS. 1 and 5 are discussed separately, the PVBS 10' may include both the CPs 14-18 of FIG. 1 and the display devices 68-1 through 68-1 of FIG. 5.

As illustrated, the system 10' includes the PVBS master server 12 and the display devices 68-1 through 68-3 interconnected by the network 20. The display devices 68-1 through 68-3 may be personal computers, portable devices such as PDAs or mobile telephones, set-top boxes, televisions, or the like and are associated with users 70-1 through 70-3. Regarding the display device 68-1, the user 70-1 interacts with the local broadcast agent 32' to create one or more personal channel profiles defining desired personal broadcast channels. The local broadcast agent 32' aggregates the personal channel profiles and identifies the types of content desired for the personal broadcast channels and optionally relative amounts of content desired for each type of content. The local broadcast agent 32' then sends a request for the desired types of content and optionally the relative amounts of content for each type of content to the content distribution agent 22. In a similar fashion, local broadcast agents of the other display devices 68-2 and 68-3 send requests to the content distribution agent 22.

At some time thereafter, the content distribution agent 22 identifies content from the content database 24 and optionally advertisements from the advertisements database 26 to provide to each of the display devices 68-1 through 68-3. The content distribution agent 22 then aggregates the requests from the display devices 68-1 through 68-3 and generates a content distribution plan for distributing the identified content to the display devices 68-1 through 68-3.

Then, as discussed above, in one embodiment, the content distribution agent 22 provides a content list to the local broadcast agent 32' identifying the content that is to be distributed to the display device 68-1. In response, the local broadcast agent 32' generates a schedule for each of the personal broadcast channels based on the corresponding personal channel profiles and the content list. Likewise, the content distribution agent 22 may provide content lists to the other display devices 68-2 and 68-3. In response, the local broadcast agents of the display devices 68-2 and 68-3 generate schedules for personal broadcast channels of the users 70-2 and 70-3. The content distribution agent 22 then distributes the content to the display devices 68-1 through 68-3 according to the distribution plan. Again, the distribution plan preferably uses multicasting to efficiently transfer the content to the display devices 68-1 through 68-3. For example, if a particular video is to be distributed to the display devices 68-1 and 68-2, the distribution plan may be generated such that the content distribution agent 22 multicasts the video to the display devices 68-1 and 68-2. Once the content is distributed to the display device 68-1, the local broadcast agent 32' may provide the personal broadcast channels for viewing by the user 70-1 based on the schedules for the personal broadcast channels.

In another embodiment, the content distribution agent 22 does not provide a content list to the local broadcast agent 32'. Rather, the content distribution agent 22 distributes content to the display devices 68-1 through 68-3 according to the distribution plan. As content is received by the display device 68-1 or at some point after the content is received, the local broadcast agent 32' generates the schedule for the personal broadcast channels based on the corresponding personal channel profiles. Thereafter, the local broadcast agent 32' may provide the personal broadcast channels for viewing by the user 70-1 based on the schedules for the personal broadcast channels.

Figure 6:
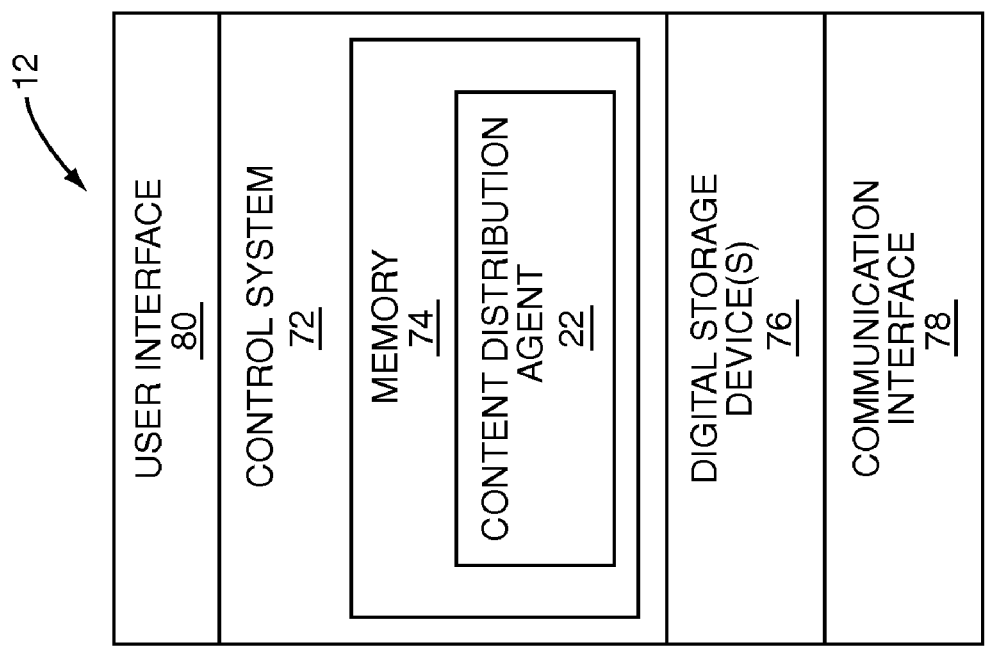
FIG. 6 is a block diagram of the PVBS master server of FIGS. 1-5 according to one embodiment of the present invention.

FIG. 6 is a block diagram of the PVBS master server 12 according to one embodiment of the present invention. In general, the PVBS master server 12 includes a control system 72 having associated memory 74. In this embodiment, the content distribution agent 22 is implemented in software and stored in the memory 74. The PVBS master server 12 also includes one or more digital storage devices 76, which may operate to store the content database 24 and the advertisements database 26. The digital storage devices 76 may be, for example, hard disk drives, optical storage devices, memory, or the like. The PVBS master server 12 also includes a communication interface 78 communicatively coupling the PVBS master server 12 to the network 20. The PVBS master server 12 may also include a user interface 80, which may include components such as a display, one or more user input devices, and the like.

Figure 7:
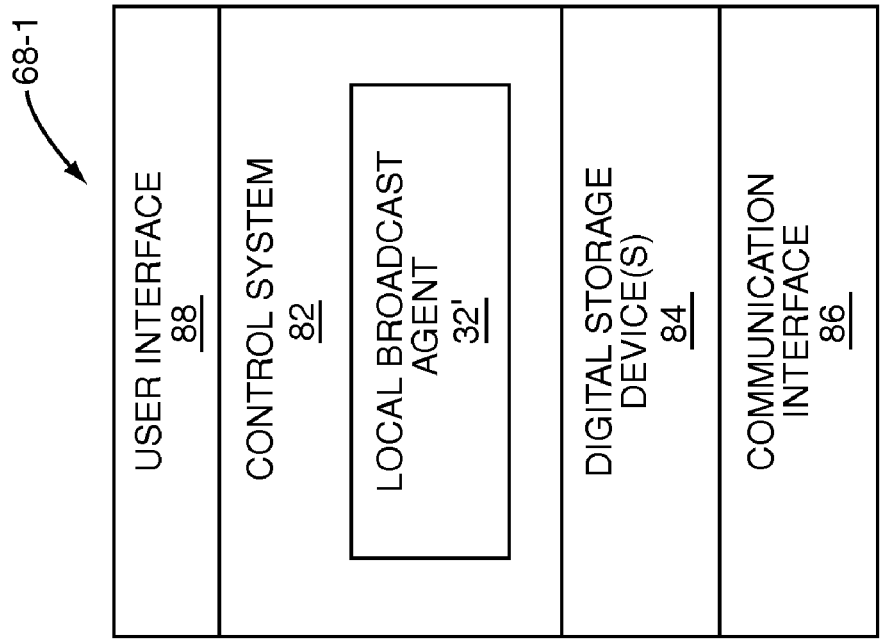
FIG. 7 is a block diagram of the display device of FIG. 5 according to one embodiment of the present invention.

FIG. 7 is a block diagram of the display device 68-1 of FIG. 5 according to one embodiment of the present invention. However, this discussion is equally applicable to the other display devices 68-2 and 68-3. In general, the display device 68-1 includes a control system 82 including the local broadcast agent 32'. As will be apparent to one of ordinary skill in the art, the control system 82 may include hardware and/or software components in addition to the local broadcast agent 32' depending on the particular implementation. The local broadcast agent 32' may be implemented in software, hardware, or a combination of software and hardware. The display device 68-1 also includes one or more digital storage devices 84 operating to store the personal channel profiles database 34', the content database 36', and the advertisements database 38'. The digital storage devices 84 may be, for example, hard disk drives, optical storage devices, memory, or the like. The display device 68-1 also includes a communication interface 86 communicatively coupling the display device 68-1 to the network 20. In addition, the communication interface 86 may communicatively couple the display device 68-1 to a land-based or satellite-based television service provider. The display device 68-1 may also include a user interface 88, which may include components such as one or more user input devices, a display, speakers, and the like.

As mentioned above, FIGS. 8-12 discuss an exemplary system for providing content to the PVBS master server 12 of FIG. 1. However, the content review and distribution system 90 discussed below is not limited to distributing content via the PVBS 10 and may distribute reviewed content using any type of public or commercial distribution entity or system.

Figure 8:
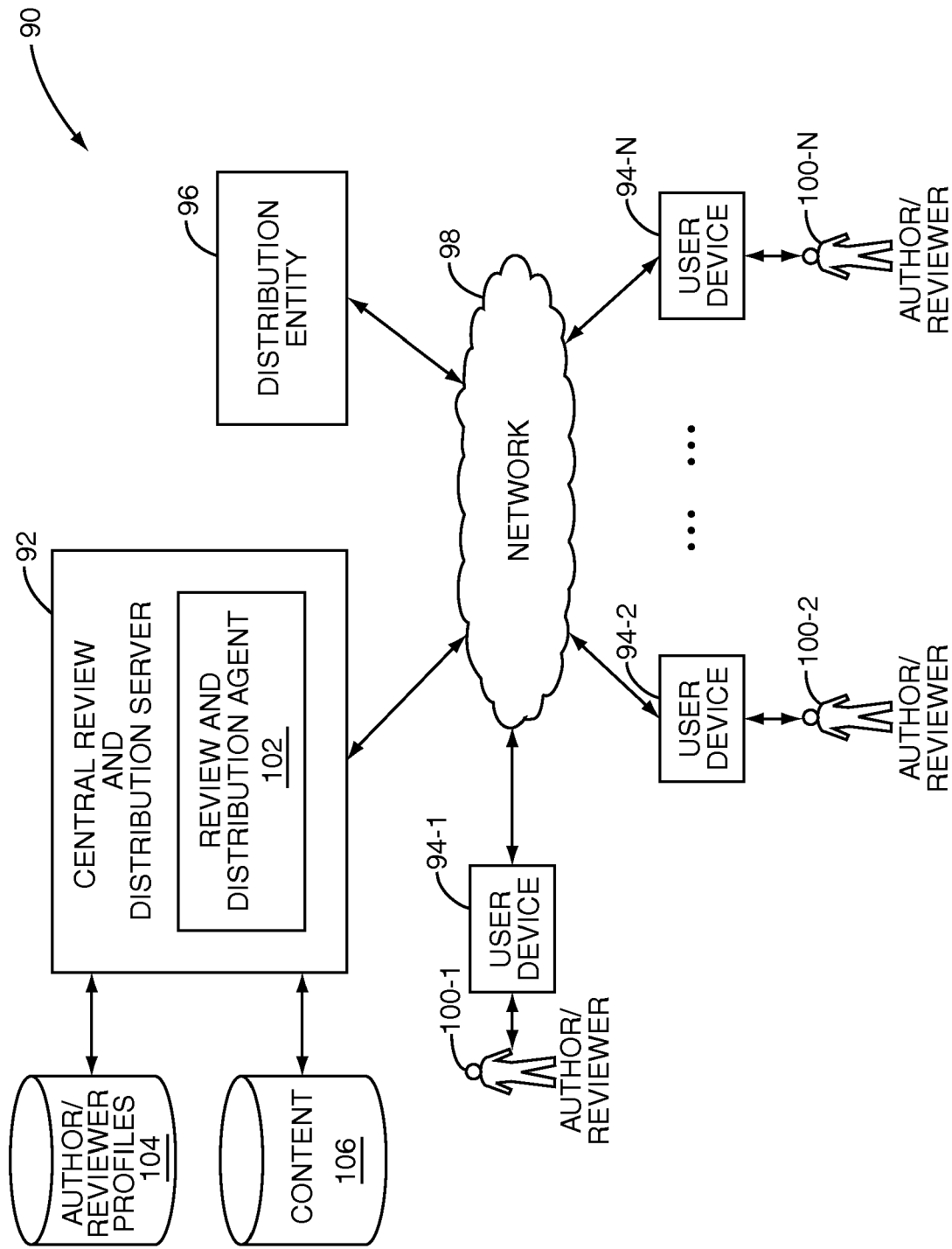
FIG. 8 illustrates a content review and distribution system according to one embodiment of the present invention.

FIG. 8 illustrates the content review and distribution system 90 according to one embodiment of the present invention. As discussed below, in an exemplary embodiment, the system 90 may provide all or a portion of the content distributed by the PVBS master server 12 described above. In general, the system 90 includes a central review and distribution server 92, a number of user devices 94-1 through 94-N, and a distribution entity 96 communicatively coupled by a network 98. The network 98 may be any type of Wide Area Network (WAN), Local Area Network (LAN), Personal Area Network (PAN), or the like. As an example, the network 98 may be a public distributed network such as the Internet. Authors/reviewers 100-1 through 100-N are associated with the user devices 94-1 through 94-N. The authors/reviewers 100-1 through 100-N are persons that both submit content to the central review and distribution server 92 for review and potentially distribution and agree to review content submitted by other persons. Depending on the particular role that the authors/reviewers 100-1 through 100-N are performing at a particular point in the following discussion, the authors/reviewers 100-1 through 100-N may alternatively be referred to as either authors 100-1 through 100-N or reviewers 100-1 through 100-N.

The central review and distribution server 92 includes a review and distribution agent 102, which may be implemented in software. As discussed below, the review and distribution agent 102 operates to effect review and potentially distribution of content authored by the authors 100-1 through 100-N. The central review and distribution server 92 also includes or is associated with an author/reviewer profiles database 104 and a content database 106. The author/reviewer profiles database 104 operates to store profiles of the authors/reviewers 100-1 through 100-N. The profiles include credentials of the authors/reviewers 100-1 through 100-N, where the credentials of the authors/reviewers 100-1 through 100-N are used to select reviewers for submitted content, as discussed below. The content database 106 operates to store content submitted to the central review and distribution server 92 for review and potentially distribution to a distribution entity such as the distribution entity 96. The content submitted for review may be any type of digital content such as, for example, videos, images, audio files, literature, or the like. Individual content, such as individual video files, may be referred to herein as digital assets.

The user devices 94-1 through 94-N may be, for example, personal computers; portable devices such as PDAs, mobile telephones, or mobile media players; or a like device capable of accessing the network 98. In operation, the authors/reviewers 100-1 through 100-N are enabled to submit content to the central review and distribution server 92 and review content submitted to the central review and distribution server 92 by others of the authors/reviewers 100-1 through 100-N via the user devices 94-1 through 94-N.

The distribution entity 96 may be a public or commercial content distribution entity. For example, the distribution entity 96 may be a commercial content provider such as the PVBS master server 12 discussed above, a television service provider, or the like. Alternatively, the distribution entity 96 may be a public content provider such as, for example, http://www.youtube.com, http://www.video.google.com, or the like.

Note that while FIG. 8 illustrates the review and distribution agent 102 as being implemented on the central review and distribution server 92, the present invention is not limited thereto. For example, the review and distribution agent 102 may alternatively be implemented as a distributed agent hosted by one or more of the user devices 94-1 through 94-N where the user devices 94-1 through 94-N are configured as a P2P network.

Figure 9:
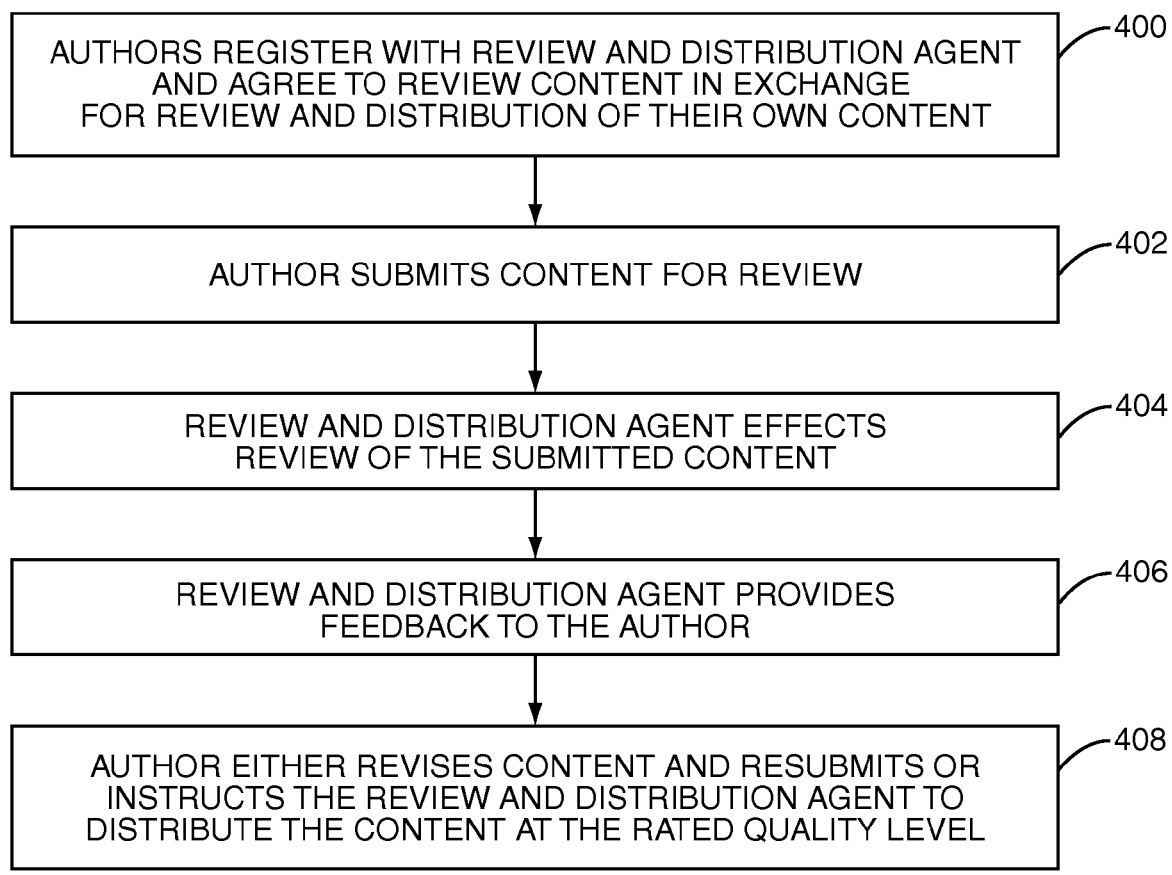
FIG. 9 illustrates the operation of the content review and distribution system of FIG. 8 according to one embodiment of the present invention.

FIG. 9 illustrates the operation of the system 90 of FIG. 8 according to one embodiment of the present invention. First, the authors 100-1 through 100-N register with the review and distribution agent 102 via the user devices 94-1 through 94-N (step 400). During registration, the authors 100-1 through 100-N agree to review content submitted by others of the authors 100-1 through 100-N in exchange for review and potentially distribution of their own content. For example, the author 100-1 may agree to review two digital assets submitted by others of the authors 100-2 through 100-N for each digital asset submitted by the author 100-1 for review and potentially distribution. The agreements may be enforced by refusing to distribute content submitted by the authors 100-1 through 100-N until the authors have met the requirements of the agreement.

At some point in time, one of the authors 100-1 through 100-N submits content to the review and distribution agent 102 for review and potentially distribution (step 402). For this discussion, the author 100-1 is the author that submits the content. When submitting the content, the content and metadata for the content are provided to the review and distribution agent 102. Alternatively, only the metadata for the content may be provided to the review and distribution agent 102. The metadata may be defined by the author 100-1, automatically populated, or both. The metadata preferably includes a target quality level for the content selected by the author 100-1. In addition or alternatively, the metadata may include a content type such as video, image, or audio; file format; file size; resolution; title; brief description; keywords; genre or content category such as comedy, history, drama, mystery, action, science fiction, or the like; sub-genre or sub-category such as standup, sitcom, movie, or the like; requested distribution scheme such as free, copyrighted, ad-based, payment-on-demand, or the like; usage polices such as DRM restrictions for the content when distributed; recommended reviewers; non-recommended reviewers; or the like.

Next, the review and distribution agent 102 effects review of the submitted content according to the present invention (step 404). The details of the review process are discussed below in detail with respect to FIG. 10. In the preferred embodiment, the review and distribution agent 102 effects an iterative review process based on quality level. More specifically, the author 100-1 selects a target quality level for the submitted content. The target quality level may be between and including a minimum quality level, which may be quality level 1, and a maximum quality level, which may be quality level 3. The submitted content is iteratively reviewed by groups of the reviewers 100-2 through 100-N selected for each quality level up to the target quality level or until the submitted content fails to satisfy the requirements of a quality level. Based on the review, the content is assigned a rated quality level. The rated quality level may be used to define, for example, a value of the content to a commercial distribution entity. The review may also check for copyright infringement and the correctness or accuracy of the metadata associated with the submitted content. In addition, the review may allow reviewers, which are select ones of the other authors/reviewers 100-2 through 100-N, to provide comments or other feedback to the author 100-1 regarding the submitted content.

After review of the submitted content, the review and distribution agent 102 provides feedback including the rated quality level to the author 100-1 via the user device 94-1 (step 406). Note that in an alternative embodiment, feedback may be provided to the author 100-1 after each iteration of the review process. Further note that the feedback may include identifiers (IDs) identifying feedback from each of the group of reviewers. Note that if the author 100-1 feels a review by one of the group of reviewers is inaccurate, the author 100-1 can request that the reviewer be excluded from reviewing content from the author 100-1 in the future. If a reviewer is excluded by a threshold number or percentage of the authors 100-1 through 100-N, the reviewer may be prevented from making future content submissions.

After receiving the feedback, the author 100-1 then decides either to revise the content based on the feedback and resubmit the content for review or to distribute the content at the rated quality level (step 408). Once the author 100-1 decides to distribute the content, the review and distribution agent 102 effects transfer of the content to one or more distribution entities, such as the distribution entity 96, according to the desired distribution scheme and usage polices for the content. In one embodiment, the content is submitted to the review and distribution agent 102 in step 402. As such, the review and distribution agent 102 may transfer the content to the distribution entity 96 from the content database 106. In another embodiment, the review and distribution agent 102 may effect a transfer of the content from the user device 94-1 to the distribution entity 96.

Figure 10:
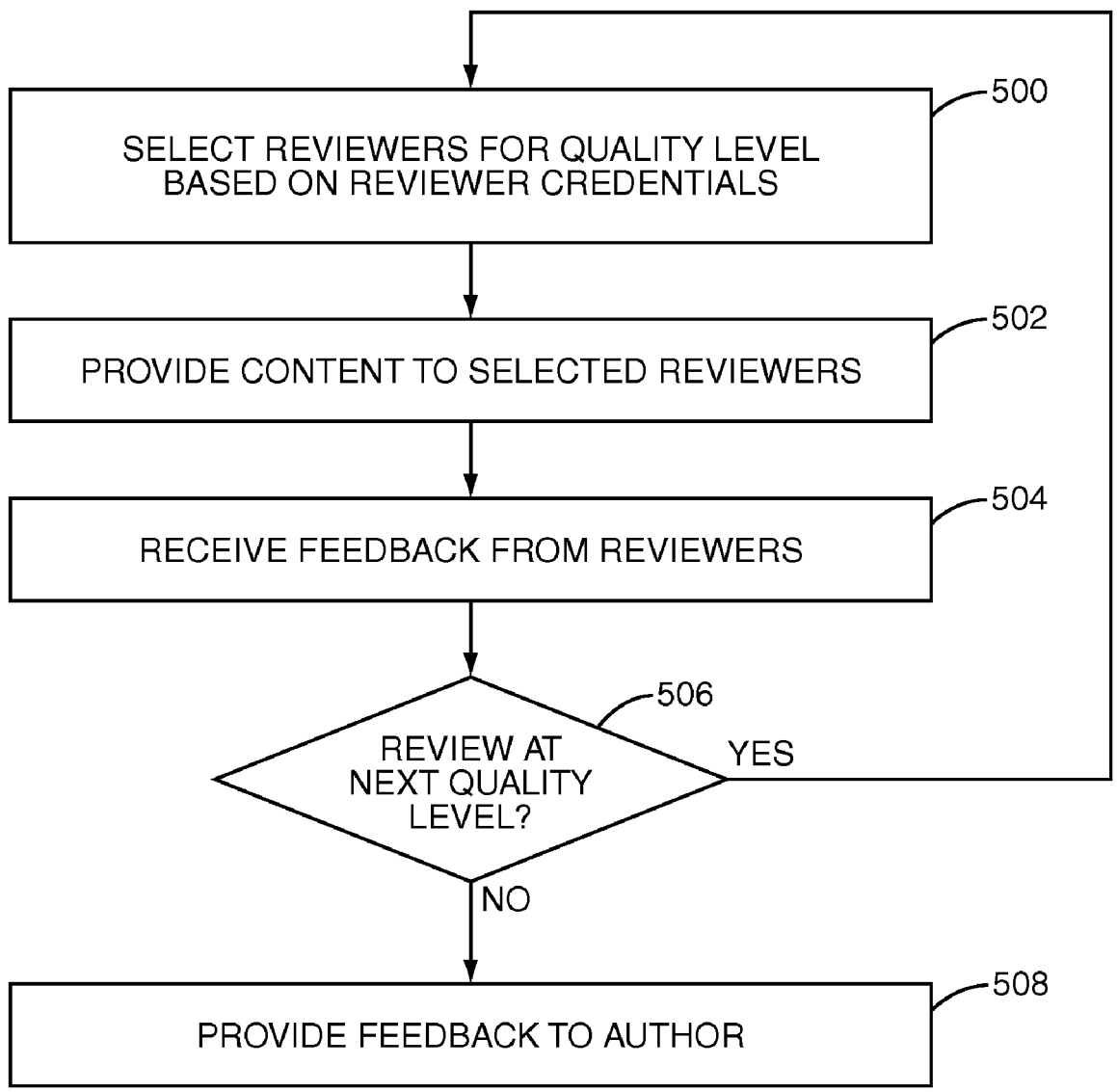
FIG. 10 is a more detailed illustration of a review process implemented by the content review and distribution system of FIG. 8 according to one embodiment of the present invention.

FIG. 10 illustrates the review process according to one embodiment of the present invention. In this embodiment, the review process is an iterative review process based on quality level where submitted content is rated at one of a number of quality levels. Each of the quality levels may have associated criteria to be used by reviewers to determine if submitted content satisfies the requirements of the quality level. First, once content is submitted for review by, for example, the author 100-1, the review and distribution agent 102 selects a group of reviewers from the reviewers 100-2 through 100-N for a first or minimum quality level based on credentials of the reviewers 100-2 through 100-N (step 500). For each of the reviewers 100-1 through 100-N, the review and distribution agent 102 generates the credentials of the reviewer based on, for example, a total number of digital assets submitted by the author/reviewer for review, a number or percentage of the total number of digital assets reviewed for each quality level, a total number of digital assets submitted by other authors and reviewed by the reviewer at each of the quality levels, and a percent deviation from the other reviewers at each quality level for the digital assets reviewed by the reviewer. In addition, the review and distribution agent 102 may maintain these statistics for a number of sub-categories within the quality levels such as content type, genre, sub-genre, requested distribution scheme, run time if applicable, and the like. This may be beneficial if specialized reviewers within each quality level are desired.

When selecting the group of reviewers based on the credentials of the reviewers 100-2 through 100-N, the review and distribution agent 102 may first consider the credentials for the reviewers 100-2 through 100-N with respect to the current quality level, which for the first iteration of the review process may be, for example, a minimum quality level. More specifically, the review and distribution agent 102 may first identify ones of the reviewers 100-2 through 100-N having credentials indicating that they have accurately reviewed content at or above the current quality level and/or have submitted content that has been reviewed at or above the current quality level. If the number of identified reviewers is greater than a desired number of reviewers for the submitted content, the review and distribution agent 102 may select a portion of the identified reviewers as the group of reviewers for the submitted content using, for example, a random selection process, based on relative credentials, or based on credentials of the identified reviewers 100-2 through 100-N with respect to other metadata for the submitted content such as content type, genre, sub-genre, requested distribution scheme, run time, or the like.

Before finalizing the selected group of reviewers from the reviewers 100-2 through 100-N, the review and distribution agent 102 may query the selected group of reviewers for their willingness to review the submitted content within a specified amount of time. The specified amount of time may be defined by the review and distribution agent 102 or by the author 100-1 of the submitted content. If all of the selected reviewers indicate willingness to review the submitted content within the specified amount of time, then the selected group of reviewers is finalized. Otherwise, ones of the selected group of reviewers that are not willing to review the submitted content within the specified amount of time may be removed from the selected group of reviewers and optionally replaced.

Once the group of reviewers is selected, the review and distribution agent 102 provides the submitted content to the selected group of reviewers, or more specifically to the ones of the user devices 94-2 through 94-N associated with the selected group of reviewers (step 502). When providing the submitted content to the selected group of reviewers, DRM policies may be applied to the submitted content such that, for example, only the selected group of reviewers may view or otherwise consume the submitted content. In addition, DRM policies may be applied to limit playback to enable or disable multiple viewings of the submitted content, to enable or disable pausing, rewinding, or fast-forwarding of the submitted content, or the like. Alternatively, rather than uploading the submitted content to the content database 106 and then providing the submitted content to the selected group of reviewers, the review and distribution agent 102 may effect a peer-to-peer (P2P) connection between the user device 94-1 of the author 100-1 and the ones of the user devices 94-2 through 94-N associated with the selected group of reviewers where the submitted content is transferred or multicast to the ones of the user devices 94-2 through 94-N associated with the selected group of reviewers.

At this point, the selected group of reviewers review the submitted content to either approve or disapprove of the submitted content being rated at the current quality level or assign the content a rated quality level, to check for copyright infringement, and to check for the accuracy of other metadata associated with the submitted content such as content type, file format, file size, resolution, run time, genre, sub-genre, and the like. In addition, the group of reviewers may comment on the title of the content, the description of the content, the keywords for the content, the requested distribution scheme for the content, the usage policies for the content, or the like. Still further, the group of reviewers may provide additional comments or feedback regarding the content.

Once reviewed, the review and distribution agent 102 receives feedback from the selected group of reviewers (step 504). Based on the feedback, the review and distribution agent 102 may decide whether to continue the review by proceeding to a review at the next quality level (step 506). If, for example, a predefined number or percentage of the select group of users has disapproved of the submitted content being rated at the current quality level, which is also referred to herein as not being reviewed to the current quality level, the review and distribution agent 102 may decide not to proceed to the review at the next quality level. In addition, if there are one or more errors with respect to the other metadata for the submitted content, the review and distribution agent 102 may decide not to proceed to the review at the next quality level. The review and distribution agent 102 may also decide not to proceed to the review at the next quality level if the current quality level is the target quality level for the content or the maximum quality level.

If the review and distribution agent 102 decides to proceed to the review at the next quality level, the review process returns to step 500 where reviewers are selected for the next quality level, and the process is repeated. If the review and distribution agent 102 decides not to proceed to the next quality level or if the submitted content has been reviewed to the target or maximum quality level, then the review and distribution agent 102 provides feedback to the author 100-1 via the user device 94-1 (step 508). The feedback includes the rated quality level, corrections to or information identifying errors in other metadata of the submitted content, and any additional comments or feedback provided by the group of reviewers during the review process. Note that the review and distribution agent 102 may require the author 100-1 to correct some or all of the errors in the metadata before distribution of the content.

Once the review process is complete, the author 100-1 may either distribute the content at the rated quality level or revise the content based on the feedback and re-submit the content for review.

In an alternative embodiment, the review and distribution agent 102 may return feedback to the author 100-1 after each iteration of the review process. In response, the author 100-1 may either revise the content based on the feedback and re-submit the revised content for the next iteration of the review process or instruct the review and distribution agent 102 to distribute the content at current rated quality level.

While the discussion above focuses on an iterative review process, the present invention is not limited thereto. For example, rather than iteratively reviewing submitted content at each successive quality level, the review and distribution agent 102 may effect review of the submitted content only at the target quality level. Further, while the discussion above focuses on the quality level as being the primary consideration for selecting reviewers, the present invention is not limited thereto. Reviewers may be selected based on credentials associated with any of the metadata for the submitted content or any combination thereof. For example, if a video of the comedy genre, the sitcom sub-genre, and a target quality level of 3 is submitted for review, the review and distribution agent 102 may select reviewers for the submitted content based on credentials of the reviewers 100-1 through 100-N with respect to videos, with respect to the comedy genre, with respect to the sitcom sub-genre, with respect to quality level 3, or any combination thereof.

Figure 11:
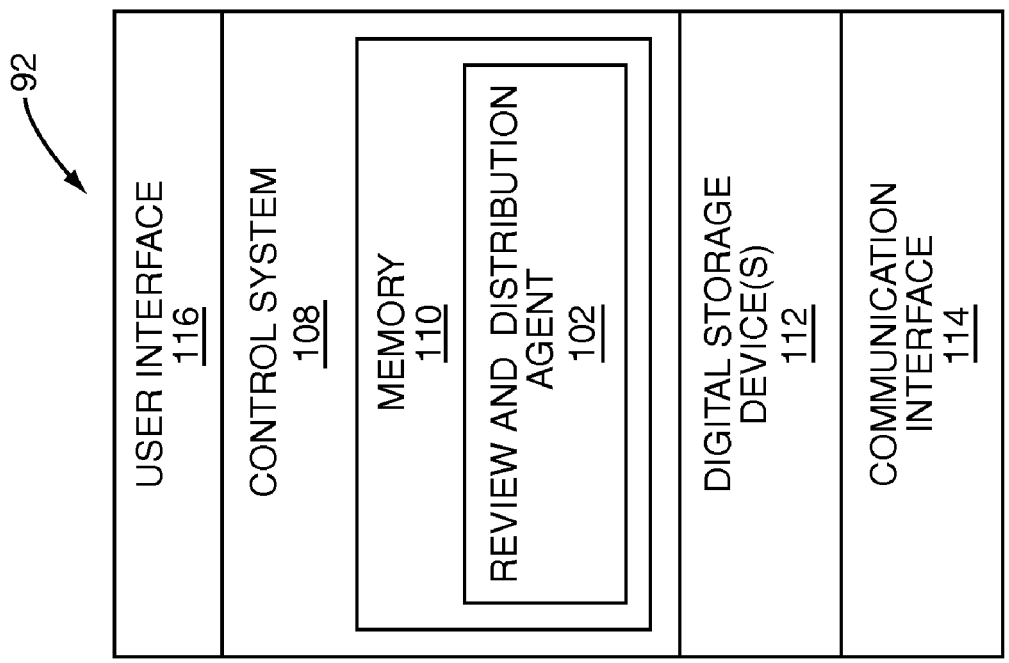
FIG. 11 is a block diagram of the content review and distribution server of FIG. 8 according to one embodiment of the present invention.

FIG. 11 is a block diagram of the central review and distribution server 92 of FIG. 8 according to one embodiment of the present invention. In general, the central review and distribution server 92 includes a control system 108 having associated memory 110. In this example, the review and distribution agent 102 is implemented in software and stored in the memory 110. The central review and distribution server 92 may also include one or more digital storage devices 112, which may be used to store the author/reviewer profiles database 104 and the content database 106. The central review and distribution server 92 also includes a communication interface 114 communicatively coupling the central review and distribution server 92 to the network 98. The central review and distribution server 92 may also include a user interface 116, which may include components such as a display, one or more user input devices, and the like.

Figure 12:
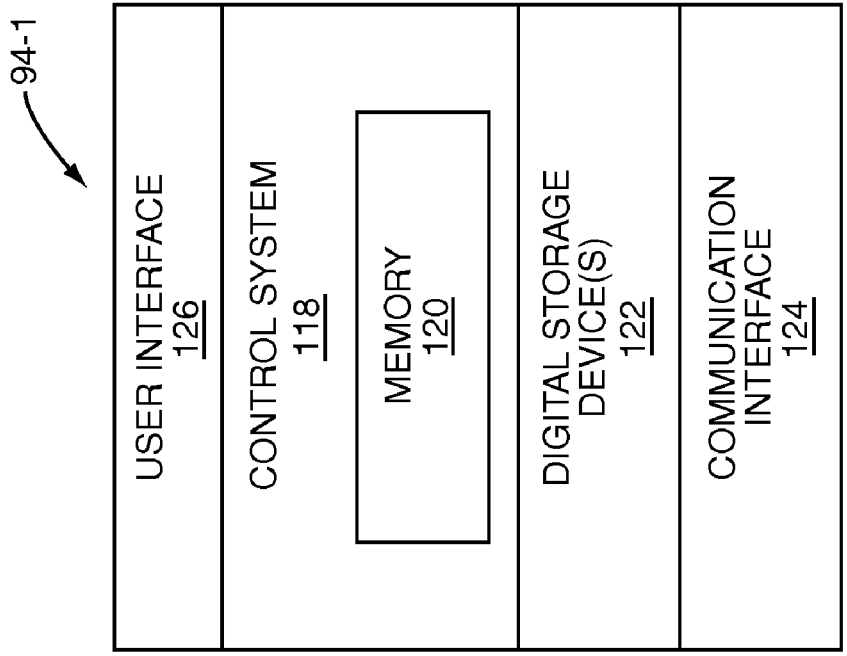
FIG. 12 is a block diagram of the user device of FIG. 8 according to one embodiment of the present invention.

FIG. 12 is a block diagram of the user device 94-1 of FIG. 8 according to one embodiment of the present invention. However, this discussion is equally applicable to the other user devices 94-2 through 94-N. In general, the user device 94-1 includes a control system 118 having associated memory 120. The user device 94-1 may also include one or more digital storage devices 122. The user device 94-1 also includes a communication interface 124 communicatively coupling the user device 94-1 to the network 98. The user device 94-1 may also include a user interface 126, which may include components such as a display, speakers, one or more user input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A computer-implemented method of reviewing and distributing digital content comprising:

identifying a plurality of authors of digital content via a registration process wherein the plurality of authors agree to review digital content in exchange for review of their own digital content;

receiving a submission from one of the plurality of authors including metadata for digital content to be reviewed where the metadata includes a target quality level for the digital content; and effecting review of the digital content by at least one group of reviewers selected from others of the plurality of authors based on the metadata for the digital content and reviewer credentials for the others of the plurality of authors, wherein effecting review of the digital content includes selecting a group of reviewers from the others of the plurality of authors based on the target quality level and the reviewer credentials of the others of the plurality of authors and feedback is provided to the one of the plurality of authors based on the review.

2. The computer-implemented method of claim 1 wherein effecting review of the digital content comprises:

a) selecting a group of reviewers from the others of the plurality of authors for a review at a first quality level that is less than the target quality level based on the reviewer credentials;

b) effecting transfer of the digital content to user devices associated with the group of reviewers;

c) receiving feedback from the group of reviewers;

d) determining whether the digital content is to be reviewed at a next quality level based on the feedback and the target quality level; and e) if the digital content is to be reviewed at the next quality level, repeating steps a)-e) for the next quality level.

3. The computer-implemented method of claim 2 wherein determining whether the digital content is to be reviewed at the next quality level comprises determining whether the digital content is rated at or above a current quality level based on the feedback from the group of reviewers and whether the current quality level is less than the target quality level.

4. The computer-implemented method of claim 2 wherein determining whether the digital content is to be reviewed at the next quality level comprises:

providing feedback to the one of the plurality of authors based on the feedback from the group of reviewers; and receiving information indicating whether the digital content is to be reviewed at the next quality level from the one of the plurality of authors, wherein the one of the plurality of authors decides whether the digital content is to be reviewed at the next quality level based on the feedback.

5. The computer-implemented method of claim 2 further comprising providing the feedback to the one of the plurality of authors based on the feedback from each of the groups of reviewers if the digital content is not to be reviewed at the next quality level.

6. The computer-implemented method of claim 1 wherein effecting review of the digital content comprises:

effecting transfer of the digital content to user devices associated with the group of reviewers, wherein feedback from the group of reviewers is provided to the one of the plurality of authors.

7. The computer-implemented method of claim 6 wherein the metadata for the digital content includes information describing the digital content, and selecting the group of reviewers comprises selecting the group of reviewers from the others of the plurality of authors based on the information describing the digital content and the reviewer credentials of the others of the plurality of authors.

8. The computer-implemented method of claim 6 wherein the metadata for the digital content includes a target quality level for the digital content and information describing the digital content, and selecting the group of reviewers comprises selecting the group of reviewers from the others of the plurality of authors based on the target quality level, the information describing the digital content, and the reviewer credentials of the others of the plurality of authors.

9. The computer-implemented method of claim 1 further comprising generating the reviewer credentials for the plurality of authors based on digital content previously submitted by each of the plurality of authors for review and digital content previously reviewed by each of the plurality of authors.

10. The computer-implemented method of claim 1 wherein the submission further comprises the digital content, and effecting review of the digital content further comprises transferring the digital content to user devices associated with the at least one group of reviewers.

11. The computer-implemented method of claim 1 wherein effecting review of the digital content comprises effecting transfer of the digital content from a user device associated with the one of the plurality of authors to user devices associated with the at least one group of reviewers in a peer-to-peer fashion.

12. The computer-implemented method of claim 1 further comprising:

receiving feedback regarding the digital content from the at least one group of reviewers; and providing feedback to the one of the plurality of authors based on the feedback from the at least one group of reviewers.

13. The computer-implemented method of claim 1 wherein the feedback provided to the one of the plurality of authors comprises information identifying a rated quality level of the digital content.

14. The computer-implemented method of claim 1 wherein the feedback provided to the one of the plurality of authors comprises at least one of a group consisting of: information identifying errors in the metadata for the digital content, information correcting errors in the metadata for the digital content, and comments regarding the digital content.

15. The computer-implemented method of claim 1 further comprising:

receiving information identifying whether the one of the plurality of authors desires to distribute the digital content based on the feedback; and effecting transfer of the digital content to at least one distribution entity if the one of the plurality of authors desires to distribute the digital content.

16. A central server for a digital content review and distribution system comprising:

a communication interface communicatively coupling the central server to user devices associated with a plurality of authors of digital content via a network; and a control system associated with the communication interface and configured to:

identify the plurality of authors of digital content via a registration process wherein the plurality of authors agree to review digital content in exchange for review of their own digital content;

receive a submission from one of the plurality of authors including metadata for digital content to be reviewed where the metadata includes a target quality level for the digital content; and effect review of the digital content by at least one group of reviewers selected from others of the plurality of authors based on the metadata for the digital content and reviewer credentials for the others of the plurality of authors, wherein effecting review of the digital content includes selecting a group of reviewers from the others of the plurality of authors based on the target quality level and the reviewer credentials of the others of the plurality of authors and feedback is provided to the one of the plurality of authors based on the review.

17. The central server of claim 16 wherein in order to effect review of the digital content, the control system is further configured to:

effect transfer of the digital content to user devices associated with the group of reviewers, wherein feedback from the group of reviewers is provided to the one of the plurality of authors.

18. The central server of claim 17 wherein the metadata for the digital content includes information describing the digital content, and the control system is further configured to select the group of reviewers from the others of the plurality of authors based on the information describing the digital content and the reviewer credentials of the others of the plurality of authors.

19. The central server of claim 17 wherein information describing the digital content, and the control system is further configured to select the group of reviewers from the others of the plurality of authors based on the target quality level, the information describing the digital content, and the reviewer credentials of the others of the plurality of authors.

20. The central server of claim 17 wherein the control system is further configured to generate the reviewer credentials for the plurality of authors based on digital content previously submitted by each of the plurality of authors for review and digital content previously reviewed by each of the plurality of authors.

21. The central server of claim 16 wherein to effect review of the digital content, the control system is further configured to:
  a) select a group of reviewers from the others of the plurality of authors for a review at a first quality level that is less than the target quality level based on the reviewer credentials;
  b) effect transfer of the digital content to user devices associated with the group of reviewers;
  c) receive feedback from the group of reviewers;
  d) determine whether the digital content is to be reviewed at a next quality level based on the feedback and the target quality level; and
  e) if the digital content is to be reviewed at the next quality level, repeat a)-e) for the next quality level.

22. The central server of claim 21 wherein the control system is further configured to provide the feedback to the one of the plurality of authors based on the feedback from each of the groups of reviewers if the digital content is not to be reviewed at the next quality level.

23. The central server of claim 21 wherein in order to determine whether the digital content is to be reviewed at the next quality level, the control system is further configured to determine whether the digital content is rated at or above a current quality level based on the feedback from the group of reviewers and whether the current quality level is less than the target quality level.

24. The central server of claim 21 wherein in order to determine whether the digital content is to be reviewed at the next quality level, the control system is further configured to:
  provide feedback to the one of the plurality of authors based on the feedback from the group of reviewers; and
  receive information indicating whether the digital content is to be reviewed at the next quality level from the one of the plurality of authors, wherein the one of the plurality of authors decides whether the digital content is to be reviewed at the next quality level based on the feedback.

25. The central server of claim 16 wherein the submission further comprises the digital content, and the control system is further configured to transfer the digital content to user devices associated with the at least one group of reviewers.

26. The central server of claim 16 wherein the control system is further configured to effect transfer of the digital content from a user device associated with the one of the plurality of authors to user devices associated with the at least one group of reviewers in a peer-to-peer fashion.

27. The central server of claim 16 wherein the control system is further configured to:
  receive feedback regarding the digital content from the at least one group of reviewers; and
  provide the feedback to the one of the plurality of authors based on the feedback from the at least one group of reviewers.

28. The central server of claim 16 wherein the feedback provided to the one of the plurality of authors comprises information identifying a rated quality level of the digital content.

29. The central server of claim 16 wherein the feedback provided to the one of the plurality of authors comprises at least one of a group consisting of: information identifying errors in the metadata for the digital content, information correcting errors in the metadata for the digital content, and comments regarding the digital content.

30. The central server of claim 16 wherein the control system is further configured to:
  receive information identifying whether the one of the plurality of authors desires to distribute the digital content based on the feedback; and
  effect transfer of the digital content to at least one distribution entity if the one of the plurality of authors desires to distribute the digital content.

* * * * *